(12) United States Patent
Benavides

(10) Patent No.: US 8,189,708 B2
(45) Date of Patent: May 29, 2012

(54) SYSTEM AND METHOD FOR ACCURATE DOWNLINK POWER CONTROL OF COMPOSITE QPSK MODULATED SIGNALS

(75) Inventor: Armando Benavides, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 964 days.

(21) Appl. No.: 12/188,764

(22) Filed: Aug. 8, 2008

(65) Prior Publication Data
US 2010/0034313 A1  Feb. 11, 2010

(51) Int. Cl.
*H03C 5/00* (2006.01)
(52) U.S. Cl. ........ 375/269; 375/281; 375/308; 375/329; 375/150; 455/522; 329/304
(58) Field of Classification Search ............ 375/268, 375/272, 279, 281, 380, 329, 150, 269, 308; 455/522, 69; 370/206, 208; 329/304
See application file for complete search history.

(56) References Cited

U.S. PATENT DOCUMENTS

| | | |
|---|---|---|
| 3,972,045 A | 7/1976 | Perret |
| 4,392,139 A | 7/1983 | Aoyama et al. |
| 4,654,484 A | 3/1987 | Reiffel et al. |
| 4,743,906 A | 5/1988 | Fullerton |
| 4,866,515 A | 9/1989 | Tagawa et al. |
| 4,901,307 A | 2/1990 | Gilhousen et al. |
| 4,958,381 A | 9/1990 | Toyoshima |
| 5,027,124 A | 6/1991 | Fitzsimmons et al. |
| 5,127,021 A | 6/1992 | Schreibert |
| 5,146,234 A | 9/1992 | Lalezari |
| 5,230,076 A | 7/1993 | Wilkinson |
| 5,249,303 A | 9/1993 | Goeken |
| 5,285,470 A | 2/1994 | Schreiber |
| 5,289,272 A | 2/1994 | Rabowsky et al. |
| 5,311,302 A | 5/1994 | Berry et al. |
| 5,313,457 A | 5/1994 | Hostetter et al. |
| 5,463,656 A | 10/1995 | Polivka et al. |
| 5,495,258 A | 2/1996 | Muhlhauser et al. |

(Continued)

FOREIGN PATENT DOCUMENTS

DE  199 57 299 A1  6/2001

OTHER PUBLICATIONS

Publication entitled "Field Experiment on Digital Maritime and Aeronautical Satellite Communication Systems Using ETS-V" by Y. Yasuda, M. Ohashi, F. Sugaya, M. Yasunaga and Y. Karasawa dated 1989.

(Continued)

*Primary Examiner* — Shaima Q Aminzay
(74) *Attorney, Agent, or Firm* — Harness, Dickey & Pierce, P.L.C.

(57) ABSTRACT

A method for controlling code power levels of individual codes of a composite quadrature phase shift keyed (QPSK) signal. The method may involve obtaining a sample of the composite QPSK signal; separating the individual codes from the composite QPSK signal; analyzing the individual codes against corresponding commanded code power settings for the individual codes; and determining a code power correction signal needed for each of the individual codes needed to adjust a code power for each of the individual codes to match their corresponding commanded code power settings.

19 Claims, 8 Drawing Sheets

U.S. PATENT DOCUMENTS

| | | | |
|---|---|---|---|
| 5,524,272 A | 6/1996 | Podowski et al. | |
| 5,555,466 A | 9/1996 | Scribner et al. | |
| 5,568,484 A | 10/1996 | Margis | |
| 5,583,735 A | 12/1996 | Pease et al. | |
| 5,666,355 A * | 9/1997 | Huah et al. | 370/311 |
| 5,722,051 A * | 2/1998 | Agrawal et al. | 455/69 |
| 5,760,819 A | 6/1998 | Sklar et al. | |
| 5,790,175 A | 8/1998 | Sklar et al. | |
| 5,801,751 A | 9/1998 | Sklar et al. | |
| 5,806,003 A | 9/1998 | Jolma et al. | |
| 5,867,765 A | 2/1999 | Nilsson | |
| 5,884,164 A | 3/1999 | Gerard et al. | |
| 5,918,176 A | 6/1999 | Arrington, Jr. et al. | |
| 5,930,230 A * | 7/1999 | Odenwalder et al. | 370/208 |
| 5,982,766 A | 11/1999 | Nystrom et al. | |
| 5,990,928 A | 11/1999 | Sklar et al. | |
| 6,005,513 A | 12/1999 | Hardesty | |
| 6,014,606 A | 1/2000 | Tu | |
| 6,034,634 A | 3/2000 | Karlsson et al. | |
| 6,047,165 A | 4/2000 | Wright et al. | |
| 6,072,792 A | 6/2000 | Mazur et al. | |
| 6,104,914 A | 8/2000 | Wright et al. | |
| 6,108,523 A | 8/2000 | Wright et al. | |
| 6,154,487 A * | 11/2000 | Murai et al. | 375/150 |
| 6,266,321 B1 * | 7/2001 | Pehkonen et al. | 370/206 |
| 6,549,525 B2 * | 4/2003 | Odenwalder | 370/332 |

OTHER PUBLICATIONS

Publication "ARINC wins support for AvSat program" by Bron Rek dated May 1987.

Publication "Applied Superconductivity" by Roger B. Poeppel, vol. 1, No. 7-9, Jul.-Sep. 1993.

"Spread-spectrum signals used in global satellite navigation" by P. Daly, S.A. Dale, I.D. Kitching and G.R. Lennen.

"Airborne array antennas for satellite communication" by M. Yasunaga, F. Watanabe and T. Shiokawa.

"Airborne Phased Array Antenna for Mobile Satellite Communications" by T. Teshirogi, M. Tanaka and S. Ohmori.

Correspondence entitled "Propagation Results of Aeronautical Satellite Communication Experiments using INMARSAT Satellite"; vol. 28, No. 4, Oct. 1992.

"Aircraft Earth Station for Experimental Mobile Satellite System" by S. Ohmori, Y. Hase, K. Kosaka and M. Tanaka.

FCC application dated Feb. 16, 1987.

* cited by examiner

AT THE GPSIIF QPSK MODULATOR THE PEAK AMPLITUDE OF THE INDIVIDUAL CODES ARE FORMED BY ADDING AND SUBTRACTING VOLTAGE VECTORS IN PHASE AND OUT OF PHASE:

$$A_{1pk} + A_{2pk} = d_{1pk} \qquad A_{1pk} - A_{2pk} = d_{2pk}$$

$$A_{1pk} = \frac{d_{1pk} + d_{2pk}}{2} \qquad A_{2pk} = \frac{d_{1pk} - d_{2pk}}{2}$$

IN A 50 OHM SYSTEM AND POWER IN dBm, THE PEAK AMPLITUDES ARE:

$$d_{1pk} = \sqrt{\frac{10^{\frac{d_{1dBm}}{10}}}{10}} \qquad d_{2pk} = \sqrt{\frac{10^{\frac{d_{2dBm}}{10}}}{10}}$$

$$A_{1pk} = \frac{1}{2}\left(\sqrt{\frac{10^{\frac{d_{1dBm}}{10}}}{10}} + \sqrt{\frac{10^{\frac{d_{2dBm}}{10}}}{10}}\right) \qquad A_{2pk} = \frac{1}{2}\left(\sqrt{\frac{10^{\frac{d_{1dBm}}{10}}}{10}} - \sqrt{\frac{10^{\frac{d_{2dBm}}{10}}}{10}}\right)$$

THE TOTAL DIFFERENTIALS FOR A1pk and A2pk are:

$$\Delta A_{1pk} = \left(\frac{d}{dd_{1dBm}} A_{1pk}\right) \cdot \Delta d_{1dBm} + \left(\frac{d}{dd_{2dBm}} A_{1pk}\right) \cdot \Delta d_{2dBm}$$

$$\Delta A_{2pk} = \left(\frac{d}{dd_{1dBm}} A_{2pk}\right) \cdot \Delta d_{1dBm} + \left(\frac{d}{dd_{2dBm}} A_{2pk}\right) \cdot \Delta d_{2dBm}$$

WHICH BECOME:

$$\Delta A_{1pk} = \frac{\ln(10) \cdot \sqrt{10}}{400} \cdot \left(\sqrt{10^{\frac{d_{1dBm}}{10}}} \cdot \Delta d_{1dBm} + \sqrt{10^{\frac{d_{2dBm}}{10}}} \cdot \Delta d_{2dBm}\right)$$

$$\Delta A_{2pk} = \frac{\ln(10) \cdot \sqrt{10}}{400} \cdot \left(\sqrt{10^{\frac{d_{1dBm}}{10}}} \cdot \Delta d_{1dBm} - \sqrt{10^{\frac{d_{2dBm}}{10}}} \cdot \Delta d_{2dBm}\right)$$

WHERE $\Delta d1dBm$ AND $\Delta d2dBm$ ARE THE DIFFERENCE BETWEEN MEASURED SCALED CODE POWER AND UPLOADED SCALED CODE POWER.
ATTENUATOR CHANGES IN dB ARE:

$$A_{tt1} = 20 \cdot \log\left(\frac{A_{1pk} + \Delta A_{1pk}}{A_{1pk}}\right) = 20 \cdot \log\left(1 + \frac{\Delta A_{1pk}}{A_{1pk}}\right)$$

$$A_{tt2} = 20 \cdot \log\left(\frac{A_{2pk} + \Delta A_{2pk}}{A_{2pk}}\right) = 20 \cdot \log\left(1 + \frac{\Delta A_{2pk}}{A_{2pk}}\right)$$

FIG 3A $$\Delta A_{tt1} = 20 \cdot \log\left\{1 + \frac{\ln(10)}{20} \cdot \frac{\sqrt{10^{\frac{d_{1dBm}}{10}}} \cdot \Delta d_{1dBm} + \sqrt{10^{\frac{d_{2dBm}}{10}}} \cdot \Delta d_{2dBm}}{\sqrt{10^{\frac{d_{1dBm}}{10}}} + \sqrt{10^{\frac{d_{2dBm}}{10}}}}\right\} \quad \text{EQUATION 1}$$

$$\Delta A_{tt2} = 20 \cdot \log\left\{1 + \frac{\ln(10)}{20} \cdot \frac{\sqrt{10^{\frac{d_{1dBm}}{10}}} \cdot \Delta d_{1dBm} - \sqrt{10^{\frac{d_{2dBm}}{10}}} \cdot \Delta d_{2dBm}}{\sqrt{10^{\frac{d_{1dBm}}{10}}} - \sqrt{10^{\frac{d_{2dBm}}{10}}}}\right\} \quad \text{EQUATION 2}$$

FIG 3B $\Delta d_{1dBm} := 6.77631 \qquad \Delta d_{2dBm} := 3.22124 \qquad$ MEASURED SCALED POWER LEVELS $\Delta d_{1UPLOADED} := 7 \cdot dBm \qquad \Delta d_{2UPLOADED} := 4 \cdot dBm \qquad$ UPLOADED SCALED POWER LEVELS $\Delta d_{1dBm} := d_{1dBm} - d_{1UPLOADED}$ $\Delta d_{2dBm} := d_{2dBm} - d_{2UPLOADED}$

REQUIRED POWER CHANGES $$\Delta A_{tt1} := 20 \cdot \log \left( 1 + \frac{\ln(10)}{20} \cdot \frac{\sqrt{10^{\frac{d_{1dBm}}{10}}} \cdot \Delta d_{1dBm} + \sqrt{10^{\frac{d_{2dBm}}{10}}} \cdot \Delta d_{2dBm}}{\sqrt{10^{\frac{d_{1dBm}}{10}}} + \sqrt{10^{\frac{d_{2dBm}}{10}}}} \right)$$

$$\Delta A_{tt2} := 20 \cdot \log \left( 1 + \frac{\ln(10)}{20} \cdot \frac{\sqrt{10^{\frac{d_{1dBm}}{10}}} \cdot \Delta d_{1dBm} - \sqrt{10^{\frac{d_{2dBm}}{10}}} \cdot \Delta d_{2dBm}}{\sqrt{10^{\frac{d_{1dBm}}{10}}} - \sqrt{10^{\frac{d_{2dBm}}{10}}}} \right)$$

$\Delta A_{tt1} = -0.457 \text{ dB} \qquad \Delta A_{tt2} = 0.833 \text{ dB} \qquad$ REQUIRED ATTENUATOR CHANGES

FIG 5

SYSTEM AND METHOD FOR ACCURATE DOWNLINK POWER CONTROL OF COMPOSITE QPSK MODULATED SIGNALS

FIELD

The present disclosure relates to power control systems and method used for controlling the downlink power of codes transmitted from one or more satellites, and more particularly to a system and method for more accurately determining power levels of the components of QPSK modulated signals being transmitted from one or more satellites in spite of temperature variations being experienced by electronic subsystems being used to transmit the signals.

BACKGROUND

The statements in this section merely provide background information related to the present disclosure and may not constitute prior art.

Accurate downlink power control is highly important in a system that utilizes multiple satellites transmitting different information at the same frequency to one user. The user receiver that decodes information from one satellite at a time, when subjected to an ensemble of many signals at the same frequency, ultimately interprets the rest of all signals as background noise, thus reducing the energy-per-bit to noise ratio and increasing the probability of error. Also, maintaining accurate drive levels over a range of operating temperatures into a non-linear radio frequency (RF) power amplifier of a satellite transponder is highly desirable as it eliminates the phase (delay) uncertainty caused by the amplitude modulated/phase modulated (AM/PM) conversion factor of its non-linear devices.

It will also be appreciated that user range error (URE) is one highly important performance parameter of the GPS system. Maintaining accurate drive levels over temperature into a non-linear RF power amplifier of a satellite transponder eliminates the phase (delay) uncertainty caused by the AM/PM conversion factor of its non-linear devices. This means enhanced position fix accuracy for both commercial and military users.

Existing solutions for power measurements of composite QPSK (quadrature phase shift keyed) signals have been developed for receivers where the signals are not known in their entirety. These designs are generally highly complex since the QPSK signal has to be separated into its quadrature components, the codes for all constituents re-generated in the receiver, and finally the separated signals need to be multiplied by the proper codes before being filtered and submitted for sampling and power measurement. After typically thousands of samples, a mean power is obtained with its associated deviation or uncertainty.

For guaranteeing accurate power downlink power control, one specific previously used technique has involved monitoring at the ground stations the power settings of all components of the composite QPSK signal. More specifically, this involves demodulating and sampling the composite QPSK signal, recalculating the inter-related power settings of the components of the QPSK signal and uploading the new power settings. This technique requires more than one cycle due to the non-linear effects of the RF power amplifier and has a minimum inherent error of approximately 0.5 dB. Since the code power measurements have to be made from a distance of approximately 26,000 km and the atmosphere is an unstable propagation media due to its different layers at different temperatures and varying densities, the accuracy in the code power setting is generally quite limited (typically worse than 0.5 dB).

For the problem of minimizing user range error (URE), there presently is no satisfactory solution. The satellite transponder and its constituent subsystems will typically vary in temperature, which presents to the RF power amplifier small power fluctuations at its input. These small power fluctuations typically result ultimately in phase (i.e., delay) changes of the transmitted signal. This is because electromagnetic energy travels at the speed of approximately 30 cm per nanosecond. Thus, one nanosecond of delay uncertainty translates into a roughly 30 cm position fix error to the user receiver.

SUMMARY

In one aspect the present disclosure relates to a method for controlling code power levels of individual codes of a composite quadrature phase shift keyed (QPSK) signal. The method may comprise: obtaining a sample of the composite QPSK signal; separating the individual codes from the composite QPSK signal; analyzing the individual codes against corresponding commanded code power settings for the individual codes; and determining a code power correction signal needed for each of the individual codes needed to adjust a code power for each of the individual codes to match their corresponding commanded code power settings.

In another aspect the present disclosure relates to a method for controlling code power levels of four individual codes of a composite quadrature phase shift keyed (QPSK) signal being transmitted from a satellite. The method may comprise: obtaining a sample of the composite QPSK signal; separating the sample into first and second signals, the first signal including components of the composite QPSK signal that are ninety degrees out of phase with respect to a zero degree phase, and the second signal including components of the composite QPSK signal that are in phase with the zero degree phase; phase detecting the first and second signals to produce demodulated first and second signals; further processing the demodulated first and second signals to generate four sampled, peak signals corresponding to first, second third and fourth navigation data codes being generated by a navigation data unit being used with the satellite; analyzing the four sampled, peak signals in relation to corresponding commanded code power settings for the four navigation data codes; and determining a code power correction signal needed for each of the four navigation data codes needed to adjust a code power for each of the navigation data codes to match corresponding commanded code power settings for each of the navigation data codes.

In another aspect the present disclosure relates to a system for controlling code power levels of individual codes of a composite quadrature phase shift keyed (QPSK) signal being transmitted from a satellite. The system may comprise: a power divider for splitting a sampled portion of the composite QPSK signal into first and second signals of equal power; a first subsystem for phase detecting, demodulating and analyzing the first signal, and analyzing first and second navigation data codes being applied by a transmitter of the satellite in forming the composite QPSK signal, and generating first and second sampled, peak signals relating to peak power levels of the first and second navigation data codes; a second subsystem for phase detecting, demodulating and analyzing the second signal, and analyzing and third and fourth navigation data codes being applied by the transmitter to form the composite QPSK signal, and generating third and fourth sampled, peak signals relating to peak power levels of the third and fourth navigation data codes; and a processor for further analyzing the first, second, third and fourth peak sampled navigation data codes and commanded navigation data codes, and generating power correction signals needed to adjust a power level of each one of the first, second, third and fourth navigation data codes being used to form the composite QPSK signal.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIGS. 3A and 3B illustrate the formulas used by the processor of the system to determine the needed code power corrections signals;

FIG. 5 shows the formulas of FIG. 3B being used to determine the code power correction signals that need to be applied to attenuators 1 and 2 in FIG. 1 which are also shown in the simulation block diagram of FIG. 4;

DETAILED DESCRIPTION

The following description is merely exemplary in nature and is not intended to limit the present disclosure, application, or uses.

Figure 1:
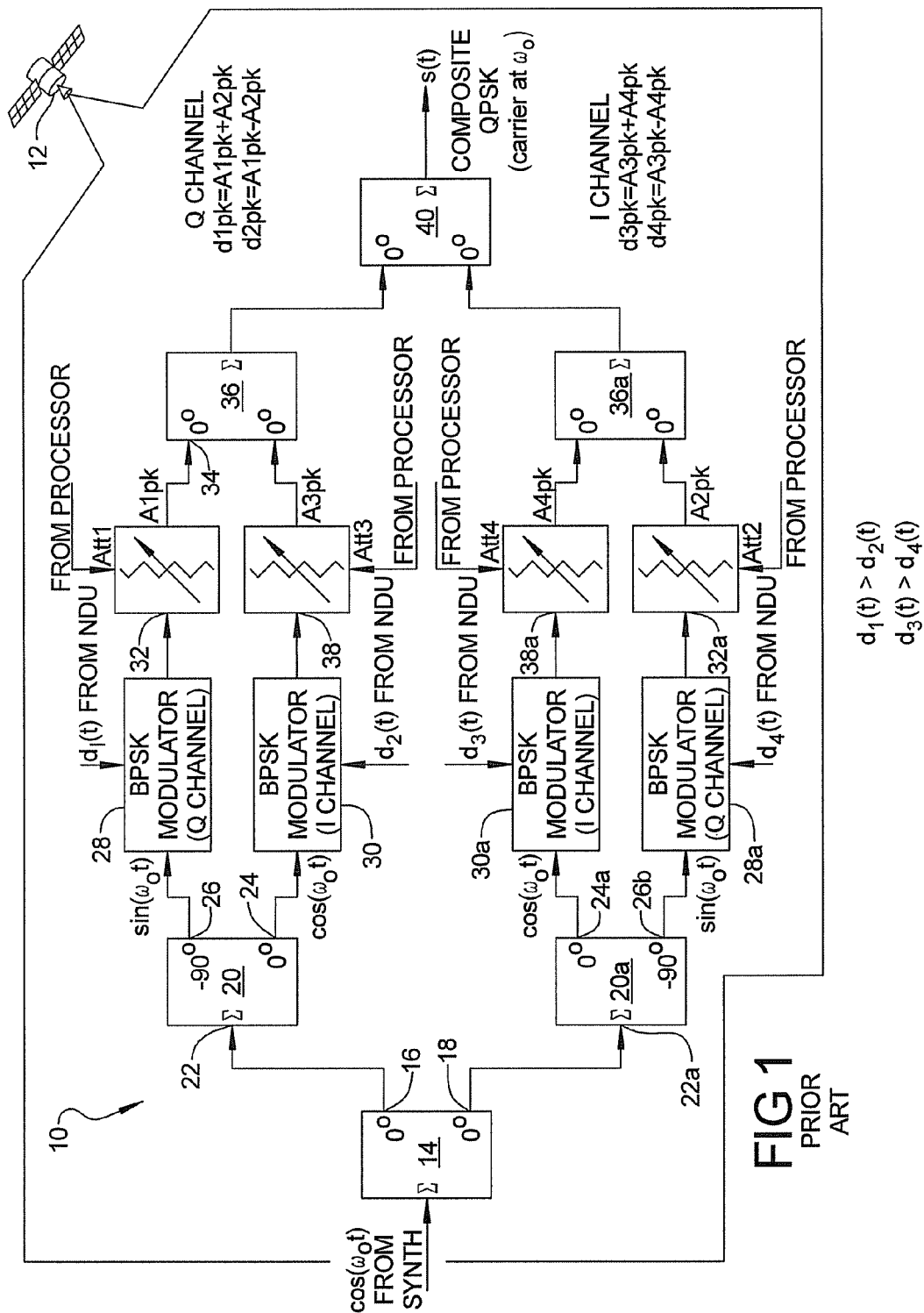
FIG. 1 is a block diagram illustration of a prior art, composite QPSK modulator system used to adjust the power levels of four navigation codes being used to form a composite QPSK signal that is transmitted from a transmitter of a satellite.

Referring to FIG. 1, a prior art transmitter 10 is shown for generating a composite quadrature phase shift keyed (QPSK) signal from a satellite 12. The transmitter typically forms a portion of a transponder that is carried by the satellite. The satellite in this example is a positioning satellite of the GPS IIF system, although it will be appreciated that the teachings of the present disclosure could be applied to any satellite transponder where it is desired to achieve a high level of control and accuracy over the downlink power used for the downlink signals transmitted from a transponder of a satellite. In this example the composite QPSK signal is received by a user receiver and used to determine a geographic location of the user receiver. However, due to temperature variations experienced by the transponder, fluctuations may exist at the input to its radio frequency (RF) amplifier that ultimately cause phase delay changes in the transmitted composite QPSK signal.

In FIG. 1 the composite QPSK signal is generated by the prior art transmitter 10 by initially receiving a carrier signal from a frequency synthesizer at the input of a power divider 14. The power divider 14 splits the carrier signal into two signals that are transmitted from outputs 16 and 18, where the two signals have the same power. A second power divider 20 receives the carrier signal at its input 22 and further splits the power such that all components of the carrier signal that are at a zero degree phase angle are applied to output 24 thereof, and all components of the carrier signal that are 90 degrees out of phase from the zero phase are applied to output 26. The signal from output 26 is then applied to a binary phase shift keyed (BPSK) Q channel modulator 28 that modulates the component of the carrier signal in accordance with information from navigation data code d1(t) from a navigation data unit (NDU), which is not shown in FIG. 1. Similarly, the component of the carrier signal at output 24 is applied to a BPSK I channel modulator 30 that also receives code d3(t) from the NDU. The Q channel modulator 28 outputs a modulated carrier signal to a first variable attenuator 32 that is controlled by an external controller (not shown). The first variable attenuator 32 outputs a signal represented by the designation "A1pk", which represents an attenuated version of the peak output from the Q channel modulator 28, to an input 34 of a power combiner 36. Similarly the I channel modulator 30 generates an output to a third attenuator 38, which in turn generates an attenuated signal designated by the notation "A3pk", which is the attenuated version of the peak output from the I channel modulator 30. The attenuated signal A3pk signal is likewise applied to an input 38 of the signal combiner 36. The output of the signal combiner 36 represents a partial formation of the QPSK signal containing the carrier being modulated with code 1 on the Q channel and the carrier being modulated with code 3 on the I channel.

The signal at output 18 of power divider 14 is also applied to a power divider 20a which as power divider 20, also has one output at zero degrees phase shift with respect to the input and the second output at a 90 degree phase shift with respect to the input forming an I channel and a Q channel respectively. Components in the upper half of the drawing in common with those in the lower part of the drawing have been designated with the same reference numbers, but that also include a prime "'" symbol. The only difference being that code $d_4(t)$ is applied to the I channel modulator 30a and code $d_2(t)$ is applied to the Q channel modulator. The output from the signal combiner 36a represents the other partial formation of the QPSK signal containing the carrier being modulated with code 2 on the Q channel and the carrier being modulated with code 4 on the I channel. Outputs from combiners 36 and 36a are routed to a final combiner 40 where the complete composite QPSK signal is finally formed containing d1pk=A1pk+A2pk and d2pk=A1pk−A2pk on the Q channel and d3pk=A3pk+A4pk, and d4pk=A3pk−A4pk in the I channel.

From FIG. 1 it will be apparent that changing just the level of attenuator 32 or 32a will affect both d1pk and d2pk, since A1pk is used in forming both d1pk and d2pk. Similarly, changing either of one of attenuators 38 and 38a will have the affect of altering the value of both d3pk and d4pk. Thus, changing the power level of the modulated signal associated with any one of the four navigation codes will affect the power level of the modulated signal associated with the other codes. The system and method of the present disclosure provides a unique approach to solving the complex problem of adjusting the code powers for each of the four navigation data codes used to make up the composite QPSK signal.

Figure 2:
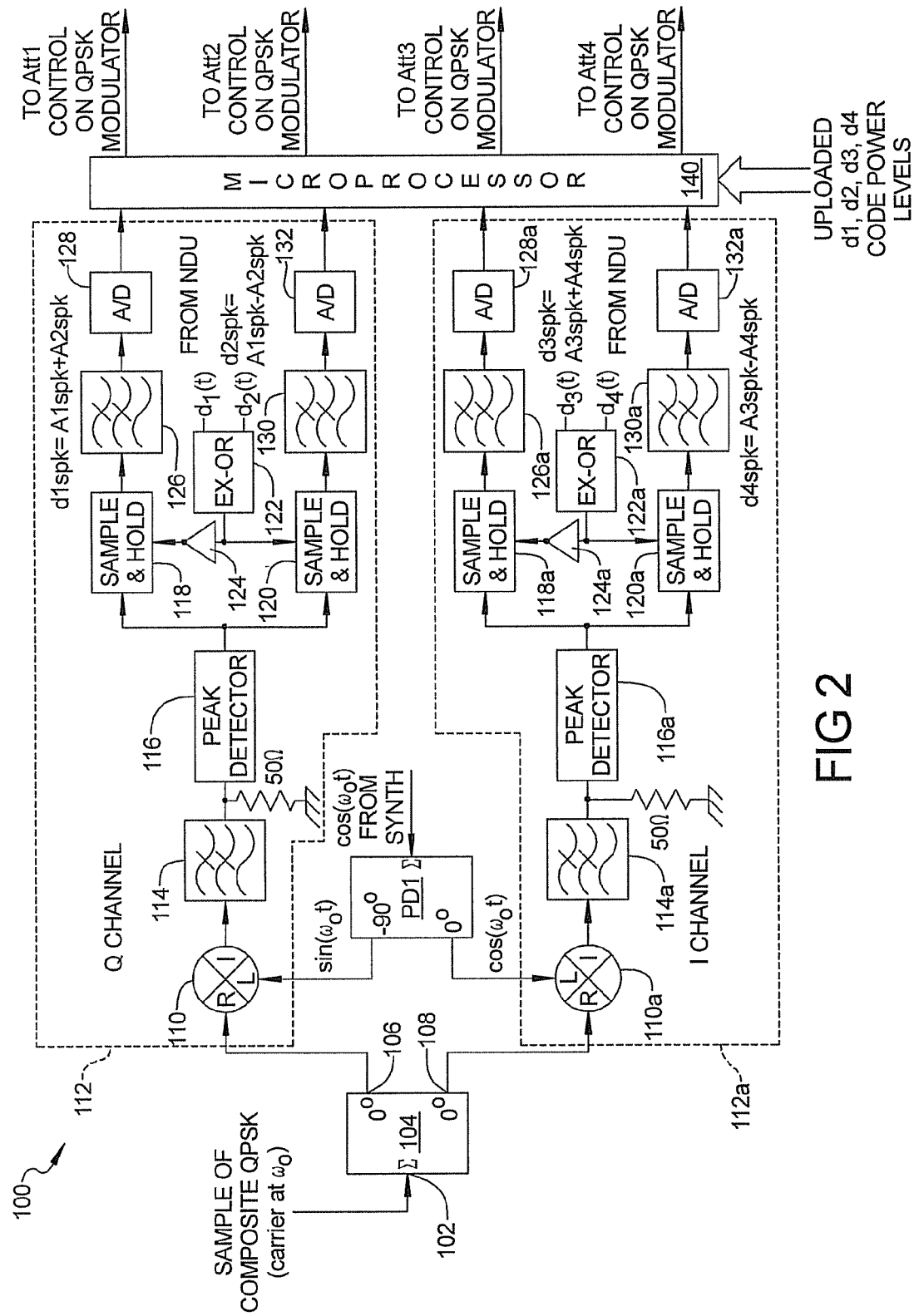
FIG. 2 is a block diagram of one embodiment of a system in accordance with the present disclosure for analyzing and determining code power correction signals that need to be applied to the transmitter.

Referring now to FIG. 2, a system 100 in accordance with one embodiment of the present disclosure is provided for adjusting the code powers of each one of the four navigation data codes $d_1(t)$, $d_2(t)$, $d_3(t)$ and $d_4(t)$ used in constructing the composite QPSK signal. The system 100 initially uses a sample of the composite QPSK signal that is output from the transmitter and feeds the sample to an input 102 of a power divider 104. The power divider 104 generates two signals at its outputs 106 and 108 that are of equal power and applies one of the two signals to a phase detector 110 of a first subsystem 112. The other one of the signals from output 108 is applied to a phase detector 110a of a second subsystem 112a. Since subsystems 112 and 112a are functionally identical, only the operation of subsystem 112 will be provided, with it being understood that the components of subsystem 112a operate in identical fashion to those of subsystem 112. Furthermore, the components of subsystem 112a in common with those of subsystem 112 have been designated with the same reference numbers used for subsystem 112 but also include a prime "'" symbol. Subsystem 112 may be termed the "Q channel" and subsystem 112a may be termed the "I channel".

A power divider PD1 is used to receive the carrier signal from a local oscillator and to split it into two signal components of equal power, with those components that are at zero degrees phase being applied to the phase detector 110a of subsystem 112a and those that are 90 degrees from zero phase being applied to the phase detector 110. The signal at the output of the phase detector 110 is routed to a low pass filter 114. The signal components of the demodulated signal output from the phase detector 110 will correspond to the codes on the Q-channel and those at the output of phase detector 110a to the codes on the I-Channel. The low pass filter 114 removes the residual carrier from the demodulated signal and generates a filtered signal to an input of a peak detector 116. The output from the peak detector 116 represents the peak of the RF signal on the Q-channel applied to the power combiner 104. The output from peak detector 116a represents the peak of the RF signal on the I-channel, which is also applied to the power combiner 104.

The output of the peak detector 116 is applied to two sample and hold circuits 118 and 120. An exclusive OR-gate 122 is used to receive the navigation codes $d_1(t)$ and $d_2(t)$ on its inputs, and its output is coupled to each of the sample and hold circuits 118 and 120. An inverter 124 is interposed between the output of the exclusive OR-gate 124 and the sample and hold circuit 118. When the $d_1(t)$ and $d_2(t)$ codes are different the exclusive OR-gate 122 outputs a logic "1" level signal. This turns on the sample and hold circuit 120, and turns off sample and hold circuit 118 because of inverter 118. When the $d_1(t)$ and $d_2(t)$ codes are the same, the output of the exclusive OR-gate is a logic 0 level, which turns on sample and hold circuit 118 and turns off sample and hold circuit 120. The $d_1(t)$ and $d_2(t)$ codes are received from the NDU unit (not shown).

When sample and hold circuit 118 is active it captures the peak of the sampled $d_1(t)$ signal, which can be designated as "d1spk". This signal can be viewed as being equal to the sampled sum (A1spk+A2spk) of the peak outputs from attenuator 1 (labeled 32 in FIG. 1) and attenuator 2 (labeled 32a in FIG. 1). The signal d1spk is then passed through a low pass filter 126 and then through an analog-to-digital (A/D) converter 128. The output from the A/D converter 128 is a digital representation of the d1spk signal. Similar operations occur at sample and hold circuit 120 which generates an output that is the sampled peak of the $d_2(t)$ navigation code, and which can be labeled as "d2spk". The value of d2spk will also be equal to A1spk−A2spk, which is the difference between the sampled, peak outputs from attenuators 1 and 2 (components 32 and 38) in FIG. 1. This signal is input to a low pass filter 130 and then A/D converted by A/D converter 132. Thus, the output of the A/D converter 132 represents a digital value for d2spk.

The I channel subsystem 112a operates identically to the Q channel subsystem 112 described above but rather operates on the in-phase signal components of the sampled composite QPSK signal. Thus, the exclusive OR-gate 122a receives codes $d_3(t)$ and $d_4(t)$ on its inputs to control the on/off operation of the sample and hold circuits 118a and 120a. Sample and hold circuit 118a generates the sampled, peak signal for code $d_3(t)$, which is labeled as d3spk in FIG. 2. The value d3spk is equal to A3spk+A4spk, which are the sampled, attenuated outputs from attenuators 3 and 4 (components 38a and 32a respectively in FIG. 1). Similarly, the output of sample and hold circuit 120a is the sampled, peak of code $d_4(t)$, which is labeled in FIG. 2 as d4spk, which is equal to A3spk−A4spk. Thus, the outputs d1spk, d2spk, d3spk and d4spk represent the actual peak, sampled values for each of the navigation codes $d_1(t)$, $d_2(t)$, $d_3(t)$ and $d_4(t)$. These values are obtained essentially in real time by the system 100.

A processor 140, which may be a microprocessor, is used to receive the outputs from each of the A/D converters 128. The processor 140 also receives the uploaded (i.e., "commanded") d1, d2, d3 and d4 code power levels that need to be used by the transmitter 10 (FIG. 1) to form the composite QPSK signal. The processor 140 calculates the power level correction that needs to be applied to each of attenuators 1-4 (components 32, 32a, 38 and 38a) of the transmitter 10 to bring the actual power levels for each of the $d_1(t)$, $d_2(t)$, $d_3(t)$ and $d_4(t)$ codes into conformity with their uploaded (i.e., commanded) code power levels. The formulas used for calculating the corrections signals for attenuator 1 and attenuator 2 are labeled as Equations 1 and 2, respectively in FIG. 3B. FIG. 3A shows the derivation for Equations 1 and 2. The equations used for the corrections needing to be applied to attenuators 3 and 4 are the same as Equations 1 and 2, respectively.

Figure 4:
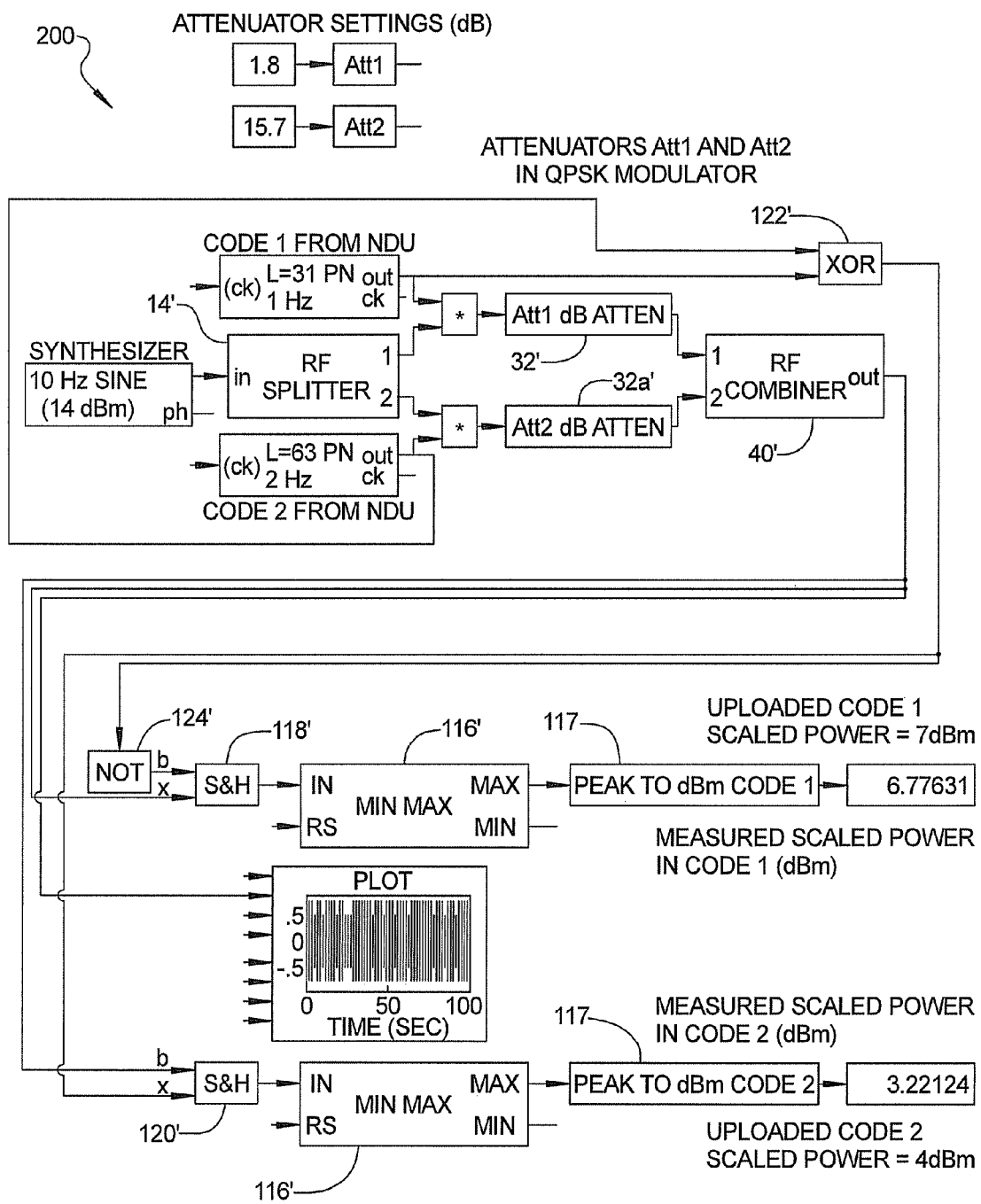
FIG. 4 is a simulation block diagram illustrating the inaccurate code power that results without the use of the system and method of FIG. 2.
Figure 6:
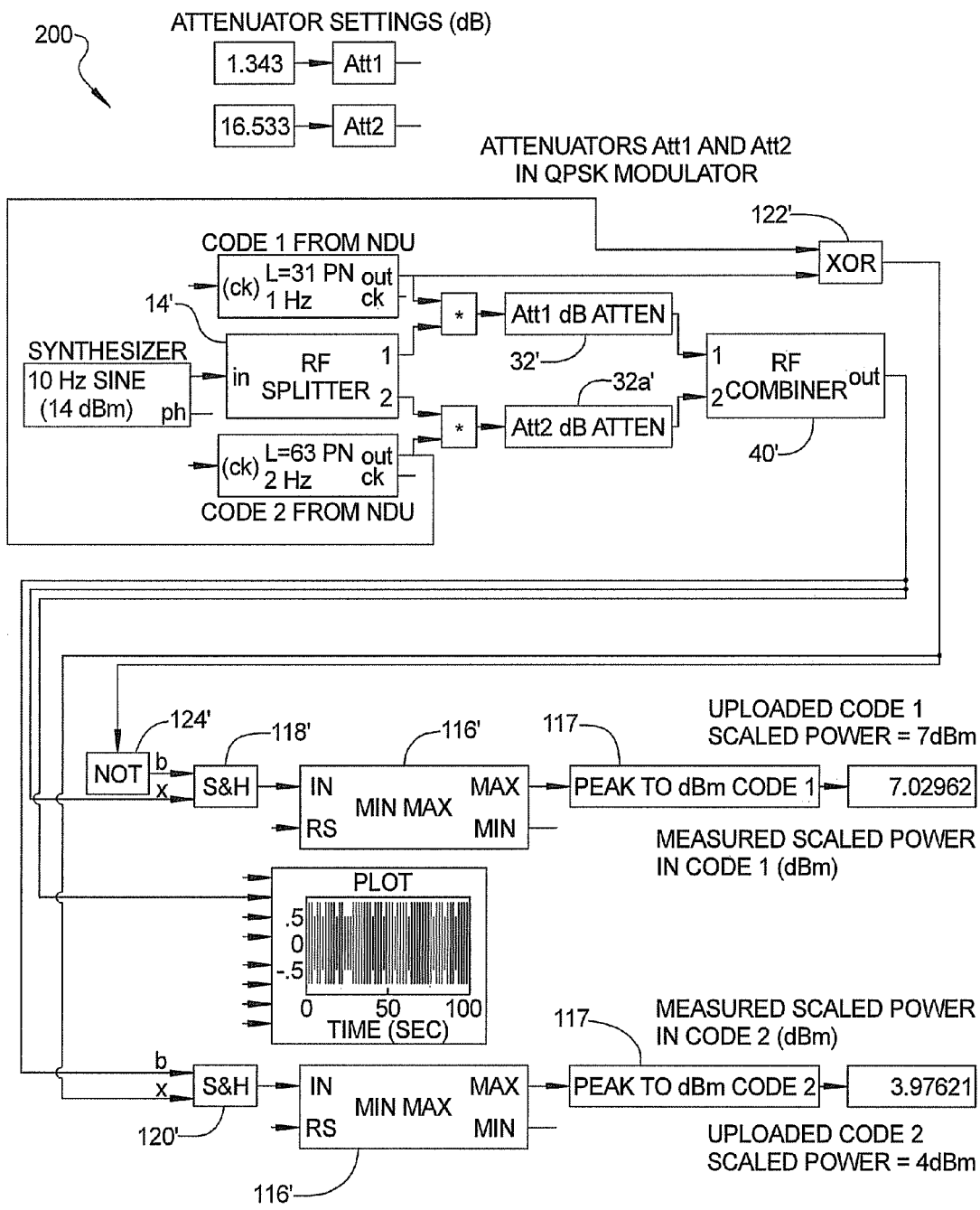
FIG. 6 is a simulation block diagram illustrating how the measured, scaled code powers for codes 1 and 2 have been corrected to be essentially equal to their respective uploaded code power settings.

Referring briefly to FIGS. 4, 5 and 6, one example is shown using a mathematical computer simulation model 200 generated with the VISSIM/COMM™ computer simulation program available from Visual Solutions, Inc. of Westford, Mass. The FIGS. 4 and 6 include mathematical operations that correspond to the functions of certain components of the system 100, and those operations have been designated by using the reference numbers used to describe the system 100, but designated with a prime "'" symbol, so that the reader is better able to correlate the mathematical operations that the simulation model 200 implements to the operations and components of the actual system 100. Boxes 117 in FIGS. 4 and 6 represent mathematical algorithms that are used to convert the peak signal to dBm values for codes 1 and 2. The boxes that include the terminology "L=31 PN" and "L=63 PN" convey that the lengths of the pseudorandom codes used are 31 bits and 63 bits respectively. It will also be noted that the codes have different frequencies of 1 Hz and 2 Hz. So in this simulation example, the two codes being operated on are different in both length and frequency, which adds to the complexity of the simulation.

The simulation model 200 shows how the present system and method corrects code power errors for just the Q channel subsystem 112 of FIG. 2 (i.e., handling just the $d_1(t)$ and $d_2(t)$ codes). It will be appreciated that the I channel subsystem 112a operates in identical fashion on the $d_3(t)$ and $d_4(t)$ codes. In FIG. 4, attenuators 1 and 2 (components 32 and 32a in FIG. 1) are set for 1.8 dB and 15.7 dB respectively, as indicated at the left side of the Figure. The uploaded code 1 has a scaled power of 7 dBm and uploaded code 2 has a scaled power of 4 dBm, as indicated at the far right side of the Figure. The measured, scaled power of code 1 (in dBm) is 6.77631, which is significantly off from the uploaded scaled code power of 7 dBm for code 1 in FIG. 4. Similarly, the measured (i.e., actual) scaled power of 3.22124 dBm for code 2 is significantly off from the uploaded code power of 4 dBm for code 2.

FIG. 5 illustrates the calculations that the processor 140 of the system 100 performs, using the just-mentioned uploaded and measured scaled power measurements for codes 1 and 2, to generate the needed code power corrections signals. In FIG. 5, the correction signal needed to be applied to attenuator 1 (component 32 in FIG. 2) to bring the measured, scaled power for code 1 into close conformity with the 7 dBm uploaded code power value is represented by $\Delta A_{tt1}$, which in this example produces a value of –0.457 dBm. This is the change that has to be applied to attenuator 1 to bring the measured, scaled code power (6.77631 dBm in this example) up to the uploaded, scaled code power of 7 dbm. Similarly, $\Delta A_{tt2}$ represents the code power level change that has to be applied to attenuator 2 (component 32a in FIG. 4) to bring the measured, scaled code power for code 2 up from 3.22124 to the uploaded code power value of 4 dBm for code 2. Referring to FIG. 6, applying the $\Delta A_{tt1}$ and $\Delta A_{tt2}$ values of –0.457 dB for code 1 and 0.833 dB for code 2, respectively, shows a new measured, scaled code power of 7.02962 dBm for code 1 and a new measured, scaled power for code 2 of 3.97621 dB. These values are a significant improvement over the uncorrected, measured scaled code power values produced in FIG. 4 and cause the measured, scaled code powers to virtually exactly match the uploaded code powers. It is to be noted that both changes should be applied simultaneously to both attenuators to obtain the desired power on both codes since each attenuator interacts with the power of both codes. In other words, these power settings are not independent of each other.

Figure 7:
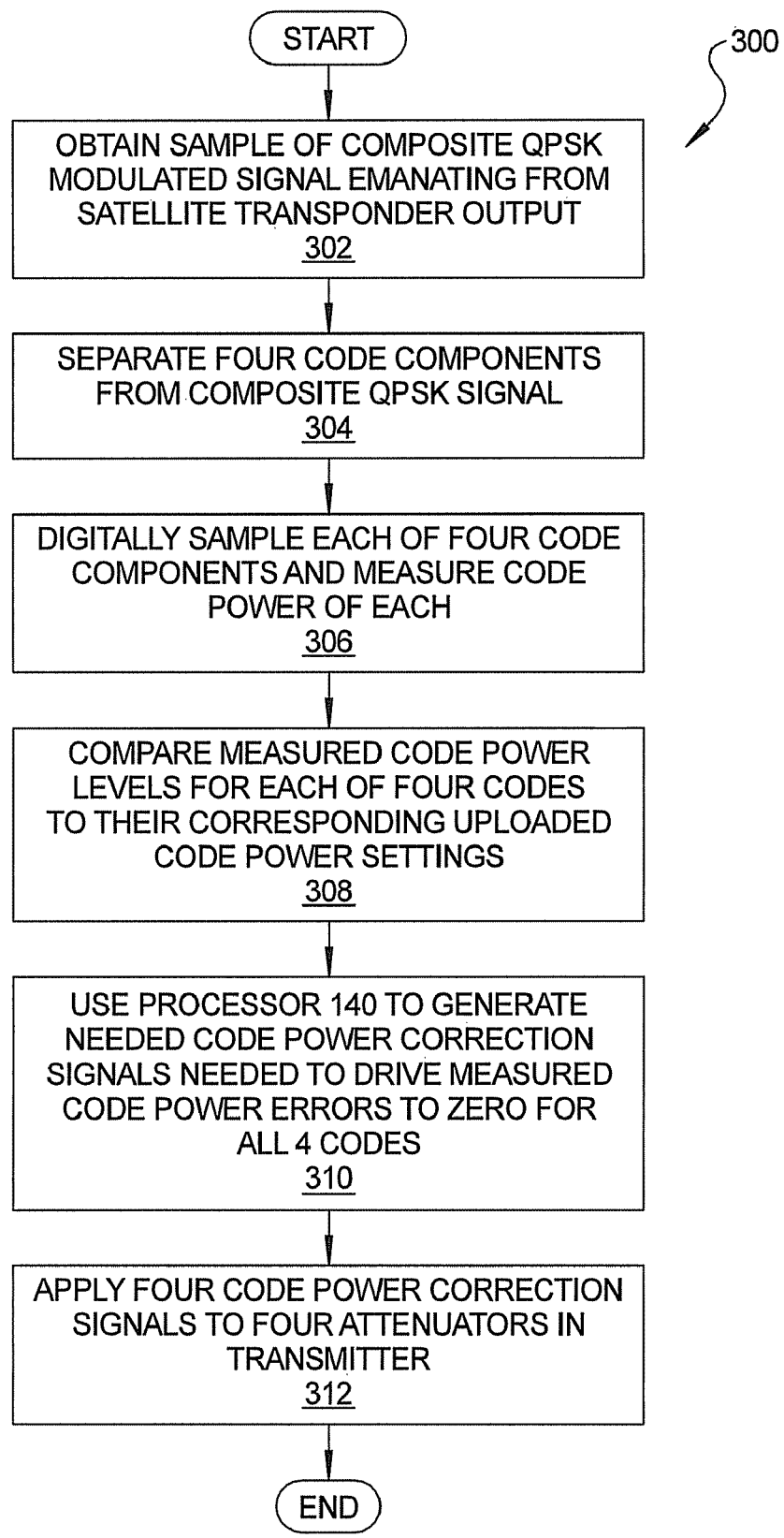
FIG. 7 is a flowchart illustrating major operations performed in detecting and adjusting the individual code powers for the four navigation data codes that are used to make up the composite QPSK signal.

Referring to FIG. 7, a flowchart 300 is illustrated that summarizes major operations of the system 100. At operation 302 a sample of the composite QPSK modulated signal emanating from the satellite transponder output is obtained. At operation 304 the four code components ($d_1(t)$, $d_2(t)$, $d_3(t)$ and $d_4(t)$) of the composite QPSK signal are separated using demodulators 110 and 110a in FIG. 2. At operation 306 each of the four codes are digitally sampled and their individual code powers are measured using the processor 140. At operation 308, the processor 140 compares the measured code powers to their corresponding uploaded code power settings. At operation 310 the processor 140 uses the equations shown in FIG. 3 to generate the code power correction signals needed to drive the measured code power errors essentially to zero. At operation 312 the code power correction signals are applied to the four attenuators (components 32, 32a, 38 and 38a) in FIG. 2.

The system and method of the present disclosure takes advantage of the fact that, at the output of the transmitter 10, the composite QPSK signal is known. Put differently, the transmitter 10 knows exactly what signals it is sending and when. This allows the implementation of a relatively inexpensive system to demodulate and measure the code power levels of each of the four navigation data codes being used to form the composite QPSK signal. The system 100 of the present disclosure provides the significant advantage of operating in real time (i.e., essentially instantaneously) to monitor the composite QPSK signal, sample it, demodulate it, measure the sampled power levels of the four independent codes making up the composite QPSK signal, and to determine the needed correction values for each of the codes. The system 100 is relatively compact and relatively inexpensive to construct.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for controlling code power levels of individual codes of a composite quadrature phase shift keyed (QPSK) signal, the method comprising:
    obtaining a sample of said composite QPSK signal;
    separating said individual codes from said composite QPSK signal, the separating being done by using a plurality of navigation data codes;
    analyzing said individual codes against corresponding commanded code power settings for said individual codes; and
    determining a code power correction signal needed for each of said individual codes needed to adjust a code power for each of said individual codes to match their said corresponding commanded code power settings, to thus drive a code power error between said individual codes and their said corresponding commanded code power settings to zero.

2. The method of claim 1, wherein said individual codes of said composite QPSK signal comprises four individual codes.

3. The method of claim 1, wherein said separating said individual codes from said composite QPSK signal comprises initially dividing said sampled composite QPSK signal into a first signal and a second signal having equal power, said first signal comprising an I-channel signal that does not have a phase shift with respect to zero degrees phase, and said second signal comprising a Q-channel signal that has a ninety degree phase shift with respect to said I-channel signal.

4. The method of claim 3, wherein said separating said individual codes from said composite QPSK signal comprises phase detecting and demodulating said first signal and second signal independently of one another.

5. The method of claim 4, wherein said separating said individual codes from said composite QPSK signal further comprises independently detecting a peak level of said first signal and a peak level of said second signal.

6. The method of claim 5, wherein said separating said individual codes from said composite QPSK signal further comprises using an exclusive OR-gate to receive the plurality of navigation data codes, wherein the plurality of navigation data codes includes a first navigation data code and a second navigation data code, the first and second navigation data codes being used to help form said composite QPSK signal, and using said first and second navigation data codes to control a pair of sample and hold circuits receiving said first signal to thus generate a pair of sampled, peak signals relating to said first and second navigation data codes.

7. The method of claim 6, wherein said separating said individual codes from said composite QPSK signal further comprises using the exclusive OR-gate to receive a third navigation data code and a fourth navigation data code of the plurality of navigation data codes, the third and fourth navigation data codes being used to help form said composite QPSK signal, and using said third and fourth navigation data codes to control an additional pair of sample and hold circuits receiving said second signal, to thus generate an additional pair of sampled, peak signals relating to said third and fourth navigation data codes.

8. The method of claim 7, wherein said separating said individual codes from said composite QPSK signal further comprises filtering and analog-to-digital converting each of said sampled, peak signals to produce four digital signals corresponding to said first, second, third and fourth navigation data codes that are indicative of an actual code power being used for each of said first second, third and fourth navigation data codes being transmitted from said satellite.

9. The method of claim 8, further comprising using a processor to receive said four digital signals and to compare said four digital signals to four commanded power codes, and to generate said code power correction signals that are applied to a transmitter of said satellite being used to transmit said composite QPSK signal, to thus modify a power level of each of said first, second, third and fourth navigation data codes being used to form said composite QPSK signal.

10. The method of claim 9, wherein said method forms a closed loop system to generate said code power correction signals in real time.

11. The method of claim 1, wherein said method forms a closed loop system for generating and applying said code power correction signals, in real time, to a transmitter transmitting said composite QPSK signal.

12. A method for controlling code power levels of four individual codes of a composite quadrature phase shift keyed (QPSK) signal being transmitted from a satellite, the method comprising:
  obtaining a sample of said composite QPSK signal;
  separating said sample into a first signal and a second signal, said first signal including components of said composite QPSK signal that are ninety degrees out of phase with respect to a zero degree phase, and said second signal including components of said composite QPSK signal that are in phase with said zero degree phase;
  phase detecting said first and second signals to produce a demodulated first signal and a demodulated second signal;
  further processing said demodulated first and second signals to generate four sampled, peak signals corresponding to a first navigation data code, a second navigation data code, a third navigation data code and a fourth navigation data code, said first, second, third and fourth navigation data codes being generated by a navigation data unit being used with said satellite;
  analyzing said four sampled, peak signals in relation to corresponding commanded code power settings for said first, second, third and fourth navigation data codes; and
  determining a code power correction signal needed for each of said first, second, third and fourth navigation data codes needed to adjust a code power for each of said first, second, third and fourth navigation data codes to match corresponding commanded code power settings for each of said first, second, third and fourth navigation data codes.

13. The method of claim 12, wherein further processing said demodulated first and second signals comprises using a first exclusive OR-gate and said first and second navigation data codes to generate a first one of said sampled peak signals and a second one of said sampled, peak signals.

14. The method of claim 13, wherein further processing said demodulated first signal and said demodulated second signal comprises using a second exclusive OR-gate and said third and fourth navigation data codes to generate a first one of said sampled, peak signals and a second one of said sampled, peak signals.

15. The method of claim 14, wherein determining said code power correction signal for each of said first, second, third and fourth navigation data codes comprises using a microprocessor to generate and apply said first, second, third and fourth code power correction signals to signal attenuators used in a transmitter of said satellite.

16. A system for controlling code power levels of individual codes of a composite quadrature phase shift keyed (QPSK) signal being transmitted from a satellite, the system comprising:
  a power divider for splitting a sampled portion of said composite QPSK signal into a first signal and a second signal, said first and second signals being of equal power;
  a first subsystem for phase detecting, demodulating and analyzing said first signal, and analyzing a first navigation data code and a second navigation data code, said first and second navigation data codes being applied by a transmitter of said satellite in forming said composite QPSK signal, and generating a first sampled, peak signal and a second sampled, peak signal, said first and second peak signals relating to peak power levels of said first and second navigation data codes;
  a second subsystem for phase detecting, demodulating and analyzing said second signal, and analyzing and a third navigation data code and a fourth navigation data code, said third and fourth navigation data codes being applied by said transmitter to form said composite QPSK signal, and generating a third sampled, peak signal and a fourth sampled, peak signal, said third and fourth sample, peak signals relating to peak power levels of said third and fourth navigation data codes; and
  a processor for further analyzing said first, second, third and fourth peak sampled, peak signals and commanded navigation data codes, and generating power correction signals needed to adjust a power level of each one of said first, second, third and fourth navigation data codes being used to form said composite QPSK signal.

17. The system of claim 16, wherein:
  said first subsystem includes a first peak detector for detecting a peak of said first signal; and
  said second subsystem includes a second peak detector for detecting a peak of said second signal.

18. The system of claim 17, wherein:
  said first subsystem includes a first exclusive OR-gate for receiving said first and second navigation data codes, and a first sample-and-hold circuit for receiving an output from said first peak detector; and
  said second subsystem includes a second exclusive OR-gate for receiving said third and fourth navigation data codes, and a second sample-and-hold circuit for receiving an output from said second peak detector.

19. The system of claim 18, wherein said processor comprises a microprocessor that generates said power correction signals, and wherein said power correction signals are applied to independent signal attenuators of said transmitter.

* * * * *